United States Patent [19]

Luise

[11] Patent Number: 5,567,770
[45] Date of Patent: Oct. 22, 1996

[54] LIQUID CRYSTALLINE POLYMER BLENDS WITH IMPROVED WEAR PROPERTIES

[75] Inventor: Robert R. Luise, Boothwyn, Pa.

[73] Assignee: E. I. Du Pont de Nemours and Company, Wilmington, Del.

[21] Appl. No.: 245,290

[22] Filed: May 17, 1994

Related U.S. Application Data

[63] Continuation-in-part of Ser. No. 67,249, May 28, 1993, abandoned.

[51] Int. Cl.$^6$ .............................. C08L 27/18; C08L 27/12
[52] U.S. Cl. .......................... 525/165; 525/178; 525/199; 525/200; 525/416

[58] Field of Search ..................... 525/165, 191, 525/178, 199, 200, 416

[56] References Cited

U.S. PATENT DOCUMENTS 4,429,078  1/1984  Cogswell et al. .................. 525/165

*Primary Examiner*—W. Robinson H. Clark

[57] ABSTRACT

This invention relates to liquid crystalline polymers, having a glass transition temperature of greater than 140° C., blended with tetrafluoroethylene polymers, said blends having improved wear properties.

15 Claims, No Drawings

LIQUID CRYSTALLINE POLYMER BLENDS WITH IMPROVED WEAR PROPERTIES

CROSS REFERENCE TO RELATED APPLICATION

This application is a continuation-in-part of U.S. patent application Ser. No. 08/067,249 filed May 28, 1993 and entitled Liquid Crystalline Polymer Blends With Improved Wear Properties, now abandoned.

FIELD OF THE INVENTION

This invention relates to a blend of a tetrafluoroethylene polymer and a liquid crystalline polymer (LCP), said LCP having a glass transition temperature (Tg) of about 140° C. or more. Such a blend has improved wear properties.

TECHNICAL BACKGROUND

It is well known that adding a tetrafluoroethylene polymer, particularly polytetrafluoroethylene (PTFE), to other polymers to form a blend often improves the wear properties of such other polymers. This characteristic is believed true of thermotropic LCPs, which by themselves are generally thought to have relatively poor wear properties. However, even when blended with tetrafluoroethylene polymers, the wear properties of LCPs could still be improved further. It has been found that when an LCP having a relatively high Tg (i.e., greater than about 140° C.) is blended with a tetrafluoroethylene polymer, the resultant blend has superior wear characteristics as compared to a blend made from an LCP having a lower Tg. It has further been found that the higher the Tg of the LCP in the blend, the higher the use temperature of the blend and the better the wear properties obtained by the blend, even under heavy frictional load.

U.S. Pat. Nos. 4,417,020 and 4,429,078 describe blends of LCPs with tetrafluoroethylene polymers. No specific mention is made in these references of the importance of the Tg of the LCP in these blends.

G. S. O'Brien et al., Compalloy '91, Proceedings of the Fourth International Congress on Compatibilizers and Reactive Polymer Alloying, New Orleans, Jan. 30-Feb. 1, 1991, p. 131–148, describes the wear properties of PTFE-LCP blends. The Tgs of the LCPs are not mentioned therein.

SUMMARY OF THE INVENTION

The present invention relates to a blend comprising (a) about 3 to about 50% by weight of a tetrafluoroethylene polymer and (b) about 50 to about 7% by weight of an LCP having a Tg of about 140° C. or more, wherein the weight percents given above are based upon the total weight of components (a) and (b) only.

DETAILS OF THE INVENTION

The present invention relates to a blend of (a) a tetrafluoroethylene polymer and (b) an LCP having a Tg of about 140° C. or more.

The component (a) tetrafluoroethylene polymer is a polymer wherein about 90% or more of the repeat units therein are derived from tetrafluoroethylene, i.e. have the structure $-CF_2CF_2-$. It is preferred that any other comonomer in the tetrafluoroethylene polymer be perfluorinated. An especially preferred tetrafluoroethylene polymer is the homopolymer of tetrafluoroethylene (i.e., polytetrafluoroethylene (PTFE)).

The tetrafluoroethylene polymer useful herein is commercially available in various grades. The tetrafluoroethylene polymer can be in the form of micropowder, granules, or fibers. If used in the form of fibers, it is preferred that the fiber length be small, preferably 0.4 mm or less, and the fiber is less than 10 denier/filament. If the tetrafluoroethylene polymer is PTFE, various grades, such as granular and powder, may be used. Powder is preferred. Manufacturers of PTFE have particular grades that are recommended for use in blends where wear resistance is important and these grades are suitable for use herein.

The tetrafluoroethylene polymer component comprises about 3% to about 50%, preferably about 10% to about 40%, more preferably about 20% to about 35%, by weight of the total of the tetrafluoroethylene polymer plus the LCP.

The component (b) LCP is any thermotropic LCP that has a Tg of about 140° C. or more and that can be melt processed below its decomposition temperature. It is preferred that the Tg of the LCP be about 150° C. or more, more preferably about 160° C. or more. One preferred type of LCP is an aromatic polyester, wherein the repeat units are derived from aromatic diacids, aromatic diols, and/or aromatic hydroxyacids. By "aromatic" in the previous sentence is meant that all carboxyl and hydroxyl groups are bound directly to an aromatic ring.

LCPs useful herein include, but are not limited to, the LCPs described in U.S. Pat. Nos. 4,746,566; 4,664,972; 4,391,966; 4,762,907; 4,816,555; 4,728,714; 4,727,131; and 4,727,129; and Japanese Patent 4-66259; the disclosures of each of which are incorporated herein by reference. These patents describe various polymers, including polymers containing ester, urea, amide and/or imide linkages. LCPs containing substantial amounts of repeat units derived from the group consisting of phenylterephthalic acid, phenylhydroquinone, t-butylhydroquinone, and t-butylhydroxybenzoic acid are preferred herein. LCPs containing repeat units derived from the group consisting of t-butylhydroquinone and phenylhydroquinone are more preferred.

The blends of the present invention are prepared by mixing the tetrafluoroethylene polymer and the LCP described herein to form an intimate blend, this blend eventually being a "solid" piece containing both the LCP and tetrafluoroethylene polymer. The blends most commonly are formed by melt o blending the components. Since the LCP is melt processible, it can be melted to form the melt blend. While PTFE is not melt processible, and therefore will not melt and flow during melt processing, most copolymers of tetrafluoroethylene are melt processible. The tetrafluoroethylene polymer may or may not be melted during melt blending. Melt blending is well known to the artisan and can be carried out using a variety of equipment, such as, for example, a twin screw extruder. The resulting blend may be melt formed into useful parts, such as gaskets, bearings, guides, slides, etc., particularly in those applications where wear resistance is important. Melt forming may be accomplished by using an injection molding machine.

As used herein, Tg is measured by Dynamic Mechanical Analysis (DMA). A TA Instruments 9900 Thermal Analysis Station with a DMA-983 module was used to determine Tg in the Examples below. Test bars 0.32 cm thick were tested in the flex mode. Multi-frequency measurements were made in order to assist in assignment of peaks as the glass transition point. Maxima in the dissipation factor (Tan delta=E"/E') at 1 Hz were chosen as Tgs. The highest Tg is used and reported herein.

In another preferred mode of the invention, the blend of LCP and tetrafluoroethylene polymer, after being formed in a "final" shaped article, is heat strengthened as described in U.S. Pat. No. 4,247,514, which is hereby incorporated by reference. Heat strengthening results in shaped articles that have improved wear properties, as, for instance, Examples 7 and 8, below.

EXAMPLES

The LCPs used in the Examples and Comparative Examples are described below. In the Examples below, melting point was determined by differential scanning calorimetry at 25° C. /min and was reported on the first melt.

LCP S

LCP S was a polymer as described in U.S. Pat. No. 4,664,972, Example 2C, having a composition of t-butyl-hydroquinone/4,4'-biphenol/terephthalic acid/4-hydroxybenzoic acid, in a molar ratio 80/20/100/100, and which had a Tg of 175° C.

LCP T

LCP T was a polymer of hydroquinone/phenylhydroquinone/terephthalic acid, in a molar ratio 15/85/100, and which had a Tg of 160° C. and a melting point of 325° C.

LCP U

LCP U was a commercial product, Vectra® A900, available from Hoechst-Celanese, Summit, N.J., which has been described as a copolymer of 73/27 (mole) 4-hydroxybenzoic acid/6-hydroxy-2-napthoic acid. It had a Tg of about 100° C. and a melting point of 280° C.

LCP V

LCP V was a polymer as described in U.S. Pat. No. 5,110,896, Example LCP-4, having a composition of hydroquinone/4,4'-biphenol/terephthalic acid/2,6-naphthalene-dicarboxylic acid/4-hydroxybenzoic acid, in a molar ratio 50/50/70/30/320. It had a Tg of about 100° C. and a melting point of 336° C.

LCP W

LCP W was a poly(ester-imide) containing the repeat unit

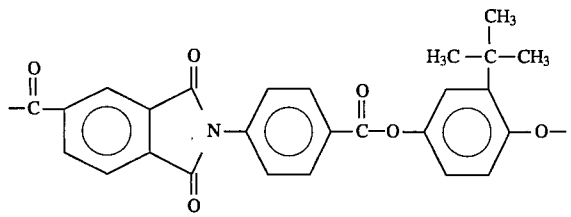

LCP W was prepared using the method that follows.

Two hundred grams of trimellitic anhydride and 145 g of p-aminobenzoic acid and 1 liter of N,N-dimethylformamide ("CDMF") were added to a 2 liter, four-neck, round bottom flask. A condenser, mechanical stirrer, and thermometer were attached to the flask and the flask contents were stirred and heated by an electric heating mantle. The contents were stirred and heated for 4.5 hours and then the solution was allowed to cool to room temperature. One liter of methanol was then added with stirring, which was continued for 5 minutes. The resulting precipitate, which was a mixture of solid and liquid, was then filtered using a Buchner funnel, and the solid was washed with 1 liter of methanol. Two liters of distilled water were then heated to boiling in a 4 liter beaker and the washed solid was added with stirring, which was continued for 5 min. The resulting mixture was then filtered using a Buchner funnel, and again the solid was washed with 1 liter of methanol. The solid product ("Monomer A") having the structure

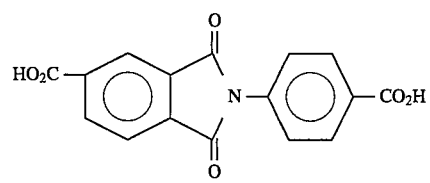

was dried in a vacuum oven with a nitrogen bleed at about 170° C. for about 18 hrs.

Three hundred fifty-two grams of Monomer A, 238.3 g of acetic anhydride and 188.4 g of t-butyl-hydroquinone were added to a resin kettle which was equipped with a stirrer and was heated by a liquid metal bath under nitrogen. The bath was heated to reflux at about 170° C. The reflux was done for one hour, after which acetic acid was distilled off as the temperature of the metal bath was gradually raised to about 310° C. over a period of approximately 2.5 hrs. The temperature was raised to 350° C. to 360° C. and the pressure was then slowly lowered over a period of 1 to 2 hrs until it reached about 133–1330 Pa. While the pressure was lowered the metal bath was held at 350° C. to 360° C. The temperature was maintained at low pressure until the desired viscosity (measured by the current draw of the stirrer motor) was reached. This took up to 4 hrs. Afterwards, stirring was stopped and the polymer was removed from the resin kettle.

LCP X

LCP X was a poly(ester-imide) containing the repeat unit

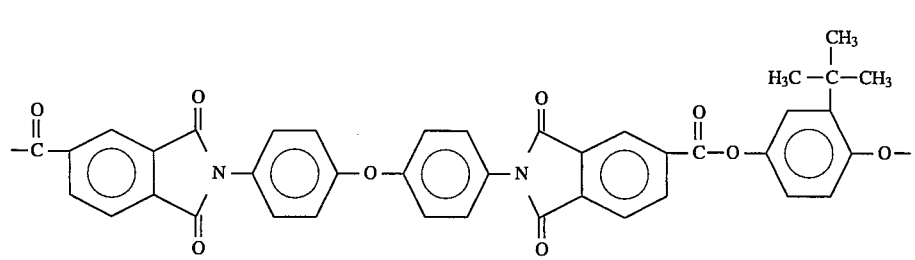

LCP X was prepared using the method that follows.

Two hundred ninety-nine grams of trimellitic anhydride were dissolved in 500 ml of DMF in a four-neck, round bottom flask equipped with a calcium sulfate drying tower, mechanical stirrer, thermometer, reflux condenser, and a graduated addition funnel. The anhydride solution was heated to 50° C. A solution of 4-aminophenylether (150 g) in 350 ml of DMF was added dropwise for about 1 hr to the anhydride solution via an addition funnel. Afterwards, the resulting solution was heated to reflux for 3 hrs, then allowed to cool to room temperature. One liter of methanol was added to the reaction contents and the product was recovered by filtration under reduced pressure. The recovered yellow solid was stirred in 2 liters of boiling water for several minutes, filtered under reduced pressure, and washed again with 1 liter of methanol. The solid product ("Monomer B") having the structure

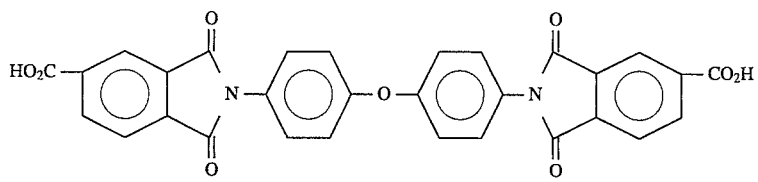

was dried in a vacuum oven with a nitrogen purge at about 100° C. for about 24 hrs.

Polymerization was carried out in the same manner as described for LCP W using 686.8 g of Monomer B, 263.6 g of acetic anhydride and 208.3 g of t-butyl-hydroquinone.

The tetrafluoroethylene polymer used in the Examples and Comparative Examples below was Teflon® micropowder MP1500 PTFE (available from E. I. du Pont de Nemours and Company) having an average particle size of 20 microns and recommended for lubrication and wear resistance purposes. It is hereinafter referred to as MP1500.

COMPARATIVE EXAMPLES A–E AND EXAMPLES 1–12

The procedure below, which was followed for Examples 1–3, was typically followed in preparing all of the LCP-PTFE blends described below.

Dried pelletized Polymer S was blended with MP1500 to obtain a blend containing 70 weight percent Polymer S and 30 weight percent MP 1500. The examples below, along with the comparative examples, each contained 70 weight percent LCP and 30 weight percent MP1500. The blend was melt mixed in a Werner-Pfieiderer 28 mm twin screw extruder equipped with standard mixing screws, a vacuum adapter attached to the mixing zone, and a 4.8 mm diameter circular die. The barrel and die temperatures were set at 330° C., the screws at 150 rpm, and the blend was extruded at a rate of 5.8 kg/hr. The blend was pelletized, dried, and then injection molded on a 170 g injection molding machine using a barrel temperature setting of 310° C. and a mold temperature setting of 100° C. The blends were molded into flex bars, 3.2 mm thick, per ASTM D790. Flex bars from the blends of other LCPs were made in similar ways, the main difference being extrusion and injection temperatures to compensate for the differing processing temperatures of the LCPs.

For wear testing (and measuring the coefficient of friction), "pins", 6.35 mm square (by 3.2 mm thick), were cut from the center edge of the flex bar. Three pins were mounted, on a 3.18 cm outer diameter circular holder, spaced 120° apart, with the original longitudinal axis of the flex bar oriented tangentially to the 2.38 cm mean diameter mounting circle. The pins were loaded axially at pressure P against a 3.18 cm outer diameter and 1.59 cm inner diameter steel washer made of American Iron and Steel Institute 1018 carbon steel and finished to a 0.40 mm (AA) roughness. The washer was rotated at velocity V, measured at the mean diameter (2.38 cm) of the washer. The temperature of the washer could be measured and this temperature was considered to be the temperature of the surface of the LCP-PTFE blend.

Wear data is summarized in Table 1, below. The higher the pressure (P) and/or velocity (V) and/or the temperature, the more severe the test and the wear are likely to be. K is volumetric wear rate divided by PV and is reported herein in units of $(cm^2/kg) \times 10^8$. The lower the value of K, the better is the wearing of the blend. Also shown in Table 1 is the coefficient of friction (Co. F), both stationary (s) and moving (d), the washer temperature (W. Temp.) in °C., and where applicable, the heat treatment.

Table 2 summarizes the Heat Deflection Temperature (HDT) in °C., measured by ASTM D648 at 1.8 MPa, of both the LCP alone and in the blend, and the Tg and melting point (Tm) of the LCPs. It is clear when comparing the data in Tables 1 and 2 that the best wear properties are shown by those blends made from LCPs having a Tg of about 140° C. or more and that such properties do not correlate with either melting point or HDT.

TABLE 1

| Ex. or Comp. Ex. | LCP in Blend | Heat Treatment** (°C./hr) | P (MPa) | V (M/Min) | K | Co.F d/s | W. Temp |
|---|---|---|---|---|---|---|---|
| A | U | — | 2.76 | 15.2 | 67.6 | 0.17/0.07 | 81 |
| B | U | — | 2.76 | 23.4 | 33380 | 0.20/0.12 | 132 |
| C | V | — | 2.76 | 15.2 | 26.2 | 0.18/0.07 | 99 |
| D | V | — | 2.76 | 23.4 | 1198 | 0.18/0.11 | 132 |
| 1 | S | — | 2.76 | 15.2 | 31.1 | 0.17/0.12 | 85 |
| 2 | S | — | 2.76 | 23.4 | 10.8 | 0.13/0.07 | 99 |
| 3 | S | — | 2.76 | 30.4 | 23.1 | 0.13/0.07 | 136 |

TABLE 1-continued

| Ex. or Comp. Ex. | LCP in Blend | Heat Treatment** (°C./hr) | P (MPa) | V (M/Min) | K | Co.F d/s | W. Temp |
|---|---|---|---|---|---|---|---|
| 4 | T | — | 2.76 | 23.4 | 11.9 | 0.12/0.09 | 98 |
| 5 | T | — | 2.76 | 30.4 | 39.4 | 0.11/0.06 | 136 |
| 6 | T | — | 2.76 | 38.1 | 12017 | 0.17/0.10 | 152 |
| 7 | S | — | 2.76 | 38.1 | 9578 | 0.17/0.10 | 153 |
| 8 | S | to 240/2 250–280/7.5 280/16 | 2.76 | 38.1 | 380 | 0.12/0.06 | 132 |
| 9* | T | — | 0.69 | 30.4 | 108 | — | — |
| 10* | S | — | 0.69 | 30.4 | 1448 | — | — |
| E* | V | — | 0.69 | 30.4 | 25624 | — | — |
| 11 | W | — | 2.76 | 53.3 | 16.4 | — | 167 |
|  | W | — | 2.76 | 61.0 | 1276 | — | 196 |
| 12 | X | — | 2.76 | 53.3 | 27.6 | — | 166 |
|  | X | — | 2.76 | 61.0 | 18.9 | — | 146 |

*Tested at 177° C.
**Under nitrogen purge

TABLE 2

| LCP | HDT LCP | HDT Blend | Tm | Tg |
|---|---|---|---|---|
| S | 169.4 | 173.5 | None | 175 |
| T | 262.0 | 260.4 | 325 | 160 |
| U | 151.3 | 170.0 | 280 | 100 |
| V | 232.9 | 227.0 | 336 | 100 |
| W | — | — | 328 | 220 |
| X | — | — | 316 | 197 |

I claim:

1. A blend comprised of (a) about 3 to about 50 weight percent of a tetrafluoroethylene polymer and (b) about 50 to about 97 weight percent of a liquid crystalline polymer having a glass transition temperature of about 140° C. or more, wherein said weight percents are based upon the total weight of components (a) and (b) only.

2. The blend of claim 1 wherein the glass transition temperature of the liquid crystalline polymer is about 150° C. or more.

3. The blend of claim 1 wherein the glass transition temperature of the liquid crystalline polymer is about 160° C. or more.

4. The blend of claim 1 wherein said tetrafluoroethylene polymer is a copolymer having perfluorinated comonomer.

5. The blend of claim 1 wherein said tetrafluoroethylene polymer is a homopolymer.

6. The blend of claim 1 wherein the liquid crystalline polymer is selected from an aromatic polyester, a poly(ester-imide) or a poly(ester-amide).

7. The blend of claim 6 wherein the liquid crystalline polymer is a poly(ester-imide).

8. The blend of claim 6 wherein the liquid crystalline polymer is an aromatic polyester.

9. The blend of claim 6 wherein the liquid crystalline polymer is a poly(ester-amide).

10. The blend of claim 6 wherein the liquid crystalline polymer is a poly(ester-imide).

11. The blend of claim 6 wherein the tetrafluoroethylene polymer is a homopolymer.

12. The blend of claim 1 wherein the liquid crystalline polymer contains repeat units derived from the group consisting of phenylterephthalic acid, phenylhydroquinone, t-butylhydroquinone, and t-butylhydroxybenzoic acid.

13. The blend of claim 1 wherein said liquid crystalline polymer contains repeat units derived from the group consisting of phenylhydroquinone and t-butylhydroquinone.

14. The blend of claim 1 wherein the tetrafluoroethylene polymer is about 10% to about 40% by weight of the total weight of the tetrafluoroethylene polymer plus the liquid crystalline polymer.

15. The blend of claim 1 which is a heat treated shaped article.

* * * * *